(12) United States Patent
Zeng

(10) Patent No.: US 10,700,576 B2
(45) Date of Patent: Jun. 30, 2020

(54) SELF-GENERATING POSITIONING DETECTOR USING WHEEL ROTATION

(71) Applicant: Guanghai Zeng, Shenzhen (CN)

(72) Inventor: Guanghai Zeng, Shenzhen (CN)

(73) Assignee: Bo Zeng, Shenzhen, Guangdong Province (CN)

( * ) Notice: Subject to any disclaimer, the term of this patent is extended or adjusted under 35 U.S.C. 154(b) by 209 days.

(21) Appl. No.: 15/871,990

(22) Filed: Jan. 16, 2018

(65) Prior Publication Data

US 2019/0222098 A1 Jul. 18, 2019

(51) Int. Cl.

| | |
|---|---|
| *G01K 1/00* | (2006.01) |
| *G01K 13/00* | (2006.01) |
| *H02K 7/18* | (2006.01) |
| *B60R 16/03* | (2006.01) |
| *G07C 5/00* | (2006.01) |
| *B60R 16/033* | (2006.01) |
| *B60B 27/00* | (2006.01) |
| *B60R 16/04* | (2006.01) |
| *H02K 11/21* | (2016.01) |
| *G01S 19/03* | (2010.01) |
| *G01S 19/01* | (2010.01) |

(52) U.S. Cl.
CPC ....... *H02K 7/1846* (2013.01); *B60B 27/0068* (2013.01); *B60R 16/033* (2013.01); *B60R 16/0307* (2013.01); *B60R 16/04* (2013.01); *G07C 5/008* (2013.01); *H02K 11/21* (2016.01); *B60Y 2400/60* (2013.01); *G01S 19/01* (2013.01); *G01S 19/03* (2013.01)

(58) Field of Classification Search
USPC ......................................... 374/141, 208, 142
See application file for complete search history.

(56) References Cited

U.S. PATENT DOCUMENTS

| 9,337,707 B2 * | 5/2016 | Dixon ................... H02K 5/136 |
| 2019/0316990 A1 * | 10/2019 | Kawahara ........... G01M 17/013 |

\* cited by examiner

*Primary Examiner* — Mirellys Jagan

(57) ABSTRACT

A self-generating positioning detector using wheel rotation, comprising a positioning detection unit arranged at a vehicle hub and a power supply unit, wherein the positioning detection unit comprises a positioning module, a wireless communication module and a temperature sensor, the power supply unit comprises an electric generator having a hub-driven rotor and a stator rotating relatively; the input ends of the positioning module and the temperature sensor are electrically communicated with the output end of the electric generator, and the output ends of the positioning module and the temperature sensor are electrically communicated with the input end of the wireless communication module. The self-generating positioning detector using wheel rotation can conduct real-time positioning and monitoring for vehicles without power supply, detect temperature of wheel axles during running, and generate power for the positioning detection unit. The detector has a simple structure and is convenient to install.

11 Claims, 4 Drawing Sheets

SELF-GENERATING POSITIONING DETECTOR USING WHEEL ROTATION

CROSS REFERENCE

This application claims the benefit of CN Patent Application No. 201820024158.6, filed on Jan. 5, 2018, the disclosure of which is incorporated by claiming priority.

TECHNICAL FIELD

The present invention relates to the field of positioning detection technologies for non-driven vehicles, and more particularly, to a self-generating positioning detector using wheel rotation.

BACKGROUND

The information of the existing non-driven vehicles such as semitrailers or camping cars cannot be obtained at a client due to the inability to position and monitor the vehicles during use, which usually leads to the delay of goods, loss of vehicles, unreasonableness of a long time waiting, and the problem that the vehicles have a potential fault but not detected so as to cause a failure in use, so that real-time processing cannot be conducted in use when the situation occurs, thus resulting in great economic losses.

SUMMARY

The present invention provides a self-generating positioning detector using wheel rotation, which solves one or more of the problems in the prior art.

The present invention provides a self-generating positioning detector using wheel rotation, which comprises a positioning detection unit arranged at a vehicle hub and a power supply unit, wherein the positioning detection unit comprises a positioning module, a wireless communication module and a temperature sensor, the power supply unit comprises an electric generator having a rotor and a stator rotating relatively, and the rotor is driven to rotate by the hub.

The input ends of the positioning module and the temperature sensor are electrically communicated with the output end of the electric generator, and the output ends of the positioning module and the temperature sensor are electrically communicated with the input end of the wireless communication module.

The self-generating positioning detector using wheel rotation provided by the present invention is applied to position vehicles without power supply like a semitrailer and a camping car, and the temperature detection of wheel axles during running, conduct real-time positioning and monitoring, and generate and supply power for the positioning detection unit. The self-generating positioning detector using wheel rotation has a simple structure, does not need modified installation on the vehicle wheels, is very simple and convenient to install, saves the cost, and is flexible to use.

In some embodiments, the rotor is fixed on a hub cover of the hub, and the stator is connected and fixed with a wheel axle.

In this way, fixing the stator with the wheel axle can ensure that the relative rotation between the stator and the rotor generates power when the vehicle is running.

In some embodiments, the stator is connected and fixed with the wheel axle through a flexible axle or a coupler.

In this way, axle connection between the stator and the wheel axle can be achieved by adopting the flexible axle or the coupler.

In some embodiments, the rotor is fixed on a hub cover of the hub, and the stator is provided with a gravity device to keep the stator not to rotate with the rotor.

In this way, the object of pinning the stator is achieved by arranging the gravity device on the stator, so as to implement the relative rotation between the stator and the rotor, and implement simple and convenient operation.

In some embodiments, the gravity device comprises a mounting base connected and fixed with the stator, one side of the mounting base vertical to a ground direction is provided with a weight balancing block, one side of the mounting base deviating from the ground is provided with a fan blade, one end of the fan blade stretches out from the mounting base, the fan blade and the weight balancing block are set at an included angle, the angle faces a driving direction of the vehicle, and the angle is 45 degrees to 180 degrees.

In this way, the weight balancing block will have a trend to rotate together with the hub during the running of the vehicle. At this moment, the resistance effect of the fan blade and air will suppression the weight balancing block to rotate together with the wheels, so as to achieve the object of keeping the stator stationary relatively to the stator. When the included angle between the fan blade and the weight balancing block is 45 degrees to 180 degrees, the effect of the fan blade for suppressing the weight balancing block is optimum.

In some embodiments, the positioning detector further comprises an acceleration sensor, the input end of the acceleration sensor is electrically communicated with the output end of the electric generator, and the output end of the acceleration sensor is electrically communicated with the input end of the wireless communication module.

In this way, setting the acceleration sensor can measure the variation and impact values of the wheels during moving, reflect the levelling of pavements, implement pavement detection quality and feed back the pavement detection quality data to a terminal server as vibration tracking for transporting sensitive articles.

In some embodiments, the power supply unit further comprises a chargeable battery, the chargeable battery is fixed on the hub cover of the hub and is communicated with the electric generator, and a commutating and voltage-stabilizing charging module is arranged between the chargeable battery and the electric generator.

In this way, setting the chargeable battery can also provide power to the positioning detection unit when the vehicle is stopped, so as to avoid losing the position detection of the vehicle due to lack of power. The commutating and voltage-stabilizing charging module is provided for regulating the voltage current and voltage between the electric generator and the chargeable battery.

In some embodiments, the outside of the chargeable battery is provided with a heating device.

In this way, the heating device is capable of heating the chargeable battery to a chargeable temperature under an ultra-low temperature condition, so as to prevent the battery from being unable to be charged due to cold conditions so that the positioning detection unit cannot be powered.

In some embodiments, a protection cover is further comprised, the positioning detection unit is fixed outside the electric generator, the protection cover is sleeved outside the positioning detection unit and the power supply unit, and is connected and fixed with the hub cover of the hub.

In this way, the protection cover can provide wind-proof, sun-proof and water-proof protections for the positioning detection unit and the power supply unit, and can be prevented from being unclenched maliciously in the meanwhile.

DETAILED DESCRIPTION

The present invention will be further described hereinafter in detail with reference to the drawings.

Figure 1:
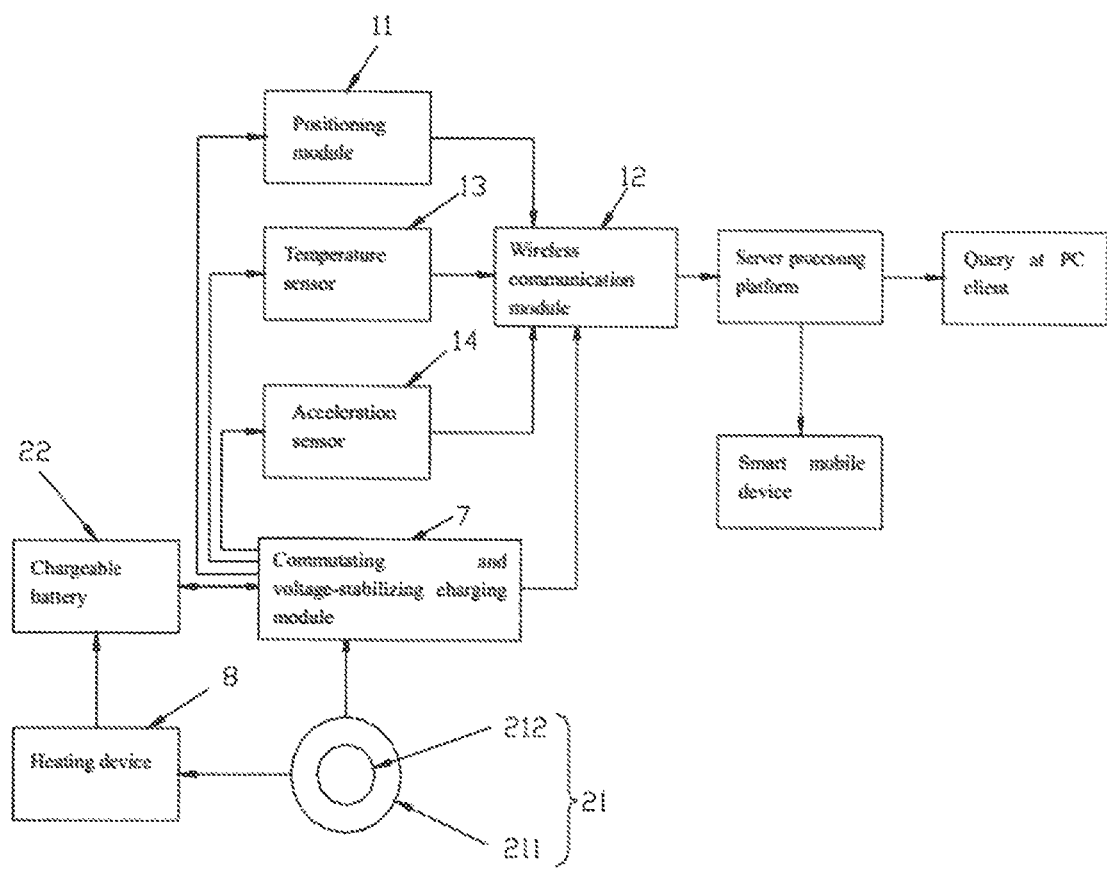
FIG. 1 is a block flow diagram of a self-generating positioning detector using wheel rotation provided by an embodiment of the present invention.

Referring to FIG. 1, a self-generating positioning detector using wheel rotation comprises a positioning detection unit 1 arranged at a vehicle hub 3 and a power supply unit, wherein the positioning detection unit 1 comprises a positioning module 11, a wireless communication module 12 and a temperature sensor 13, the power supply unit comprises an electric generator 21 having a rotor 211 and a stator 212 rotating relatively, and the rotor 211 is driven to rotate by the hub 3; the input ends of the positioning module 11 and the temperature sensor 13 are electrically communicated with the output end of the electric generator 21, and the output ends of the positioning module and the temperature sensor are electrically communicated with the input end of the wireless communication module 12.

The positioning module 11 is used for providing mobile position information of the vehicle, wherein satellite positioning, base station positioning, Bluetooth positioning and the like can be adopted. The temperature sensor 13 is used for sensing the heating condition of the wheel axle 5 of the vehicle during running; when the bearing quality or a bearing connected therewith is damaged, the temperature of the temperature sensor is abnormally high, thus determining whether the wheel shaft 5 is wrong. On the other hand, the heat temperature of the wheel shaft 5 is related to the speed and load of the vehicle, and the temperature detected by the temperature sensor 13 can be used as an overloading or over-speeding indicator. The bearing temperatures of a plurality of wheel axles 5 is collected as big data to analyze overloading and over-speeding, the levels of monitoring and controlling overloading and over-speeding are improved.

When a non-driven vehicle is running, the rotor 211 of the electric generator 21 is rotated by the wheels to rotate, so that the rotor 211 and the stator 212 rotate relatively to each other to achieve the power generation of the electric generator 21 and supply power to the positioning detection unit 1. The positioning module 11 and the temperature sensor 13 can send the position information of the vehicle during and the temperature information of the wheel axle 5 to a server processing platform through the wireless communication module 12, and a client can obtain the vehicle information from a server via a PC side or a mobile device to implement real-time monitoring.

Figure 2:
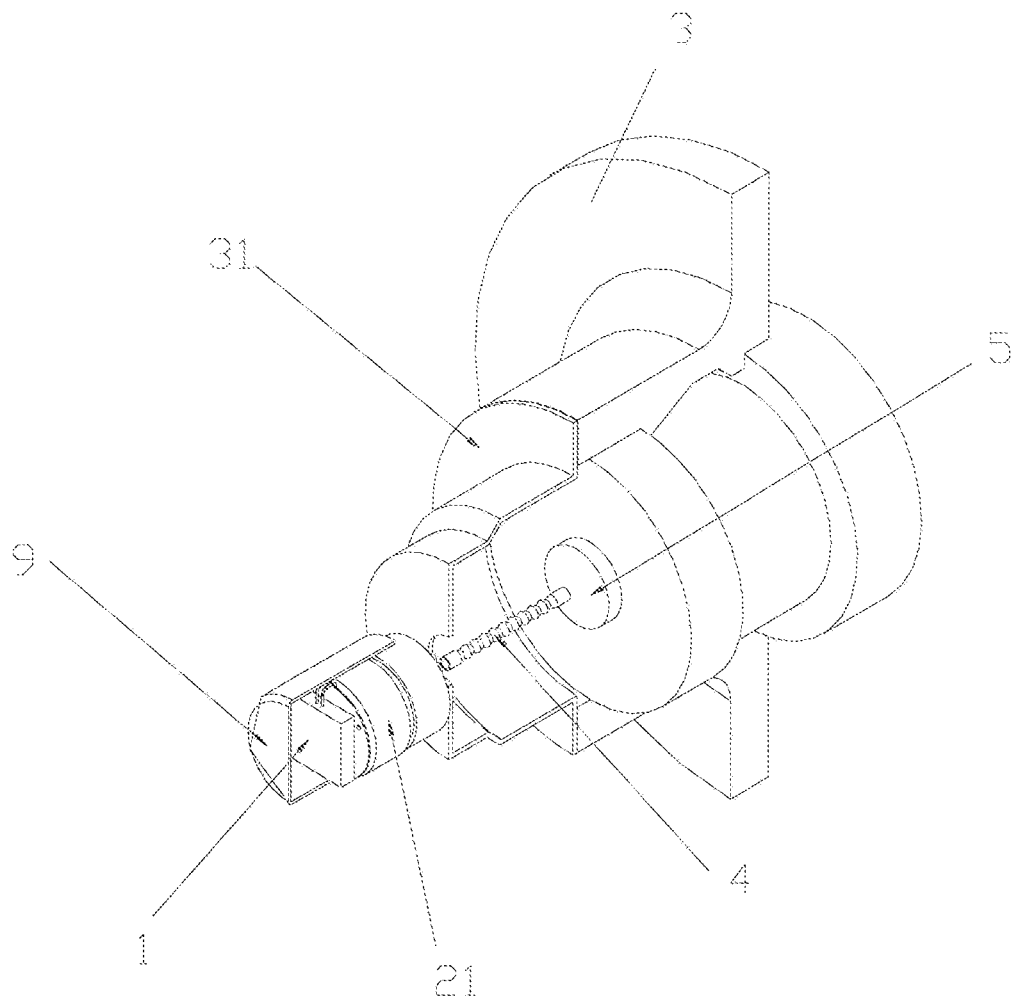
FIG. 2 is a structural schematic diagram of a self-generating positioning detector using wheel rotation provided by an embodiment of the present invention.
Figure 3:
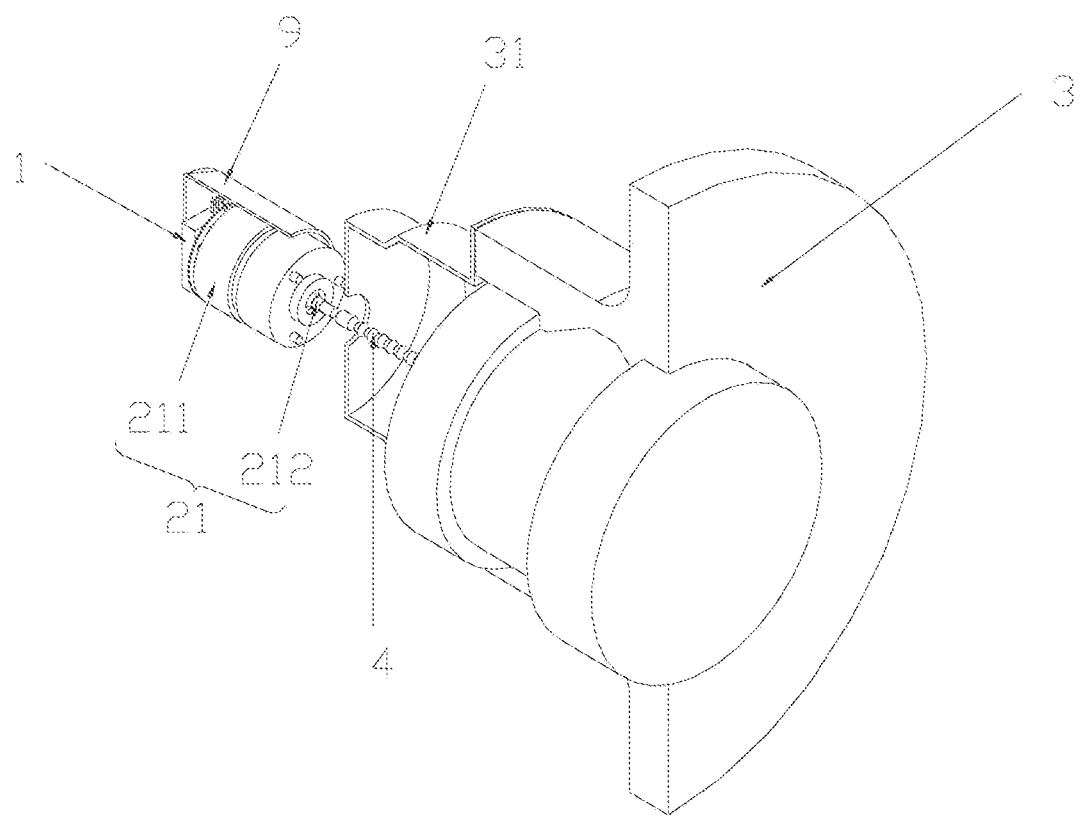
FIG. 3 is a structural schematic diagram of FIG. 2 in another direction.

Referring to FIGS. 2-3, as an embodiment of mounting the electric generator 21 and the wheels in the present invention, the rotor 211 can be fixed on a hub cover 31 of the hub 3, and the stator 212 can be connected and fixed with the wheel axle 5. In this way, during the running of the vehicle, the hub 3 can drive the rotor 211 to run, and the stator 212 keeps stationary due to the connection with the wheel axle 5, thereby achieving the power generation of the electric generator 21.

In the embodiment, the stator 212 is connected and fixed with the wheel axle 5 through a flexible axle 3 or a coupler. Connecting and fixing the stator 212 with the wheel shaft 5 by using the flexible axle 4 or coupler can avoid the problem of difficult mounting of rigid axles due to coaxiality.

Figure 4:
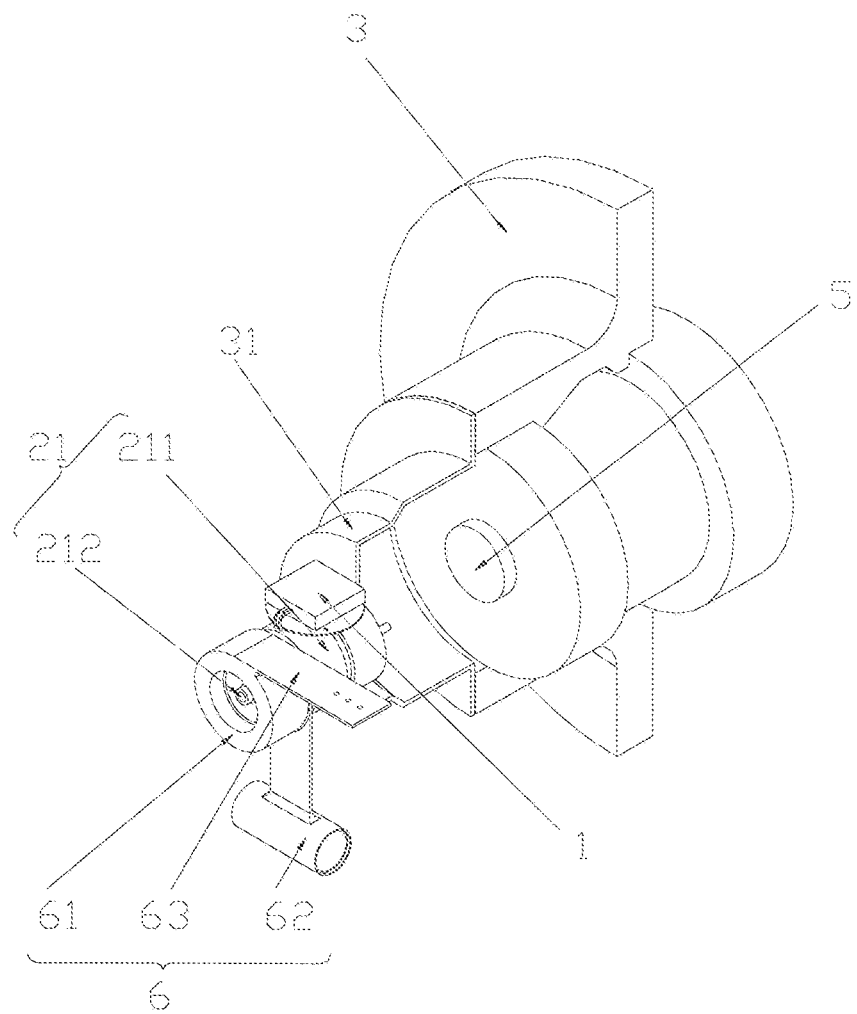
FIG. 4 is a structural schematic diagram of a self-generating positioning detector using wheel rotation provided by another embodiment of the present invention.

Referring to FIG. 4, as another embodiment of mounting the electric generator 21 and the wheels in the present invention, the rotor 211 can be fixed on the hub cover 31 of the hub 3, and the stator 212 is provided with a gravity device 6 to keep the stator 212 not to rotate with the rotor 211. In this way, the stator 212 is extended out of the rotor 211 and mounted with the gravity device 6, and then the rotor 212 and the hub cover 31 are connected to each other, so that the mounting is more convenient and the labor cost is saved.

There may be two mounting methods when adopting the embodiment: when the stator 212 is located outside the rotor 211, the rotor 211 extends outside the stator 212 and is connected and fixed with the hub cover 31, and the gravity device 6 is directly fixed to the outside of the stator 212; when the stator 212 is located inside the rotor 211, the rotor 211 is directly connected and fixed with the hub cover 31, the stator 212 extends outside the rotor 211, and the gravity device 6 is directly fixed to the stator 212. Both the two methods are very simple and convenient, which save the labor cost.

In actual use, the stator 212 may also be fixed to other non-rotating parts of the vehicle except for the non-driven wheel shaft 5. In this embodiment, fixing the stator to the wheel axle 5 is not intended to limit the fixed position of the stator 212, as long as the rotor 212 can be in a state of relative rotation to the rotor 212.

It should be noted that in the above embodiments of mounting the electric generator 21, the wheels are not required to be disassembled and modified and then assembled with the electric generator 21, and the electric generator 21 can be directly mounted on the hub cap 31, which is simple and convenient to implement, saves the mounting time and cost, and also facilitates maintenance and repairing.

To be specific, the gravity device 6 comprises a mounting base 61 connected and fixed with the stator 212, one side of the mounting base 61 vertical to a ground direction is provided with a weight balancing block 62, one side of the mounting base 61 deviating from the ground is provided with a fan blade 63, one end of the fan blade stretches out from the mounting base 61, the fan blade 63 and the weight balancing block 62 are set at an included angle, the angle faces a driving direction of the vehicle, and the angle is 45 degrees to 180 degrees.

The weight balancing block 62 will have a trend to rotate together with the hub 31 during the running of the vehicle. At this moment, the resistance effect of the fan blade 63 and air will suppression the weight balancing block 62 to rotate together with the hub, so as to achieve the object of keeping the stator 212 stationary relatively to the rotor 211. When the included angle between the fan blade 63 and the weight balancing block 62 is between 45 degrees and 180 degrees, the effect of the fan blade 63 for suppressing the weight balancing block 62 is optimum.

Further, the positioning detector 1 further comprises an acceleration sensor 14, the input end of the acceleration sensor is electrically communicated with the output end of the electric generator 21, and the output end of the acceleration sensor is electrically communicated with the input end of the wireless communication module 12. Setting the acceleration sensor 14 can measure the variation and impact values of the hub 3 during moving, reflect the levelling of pavements, implement pavement detection quality and feed back the pavement detection quality data to a terminal server as vibration tracking for transporting sensitive articles.

Further, the power supply unit further comprises a chargeable battery 22, the chargeable battery 22 is fixed on the hub cover 31 of the hub 3 and is communicated with the electric generator 21, and a commutating and voltage-stabilizing charging module 7 is arranged between the chargeable battery 22 and the electric generator 21.

Setting the chargeable battery 22 can also provide power to the positioning detection unit 1 when the vehicle is stopped, so as to avoid losing the position detection of the vehicle due to lack of power. The commutating and voltage-stabilizing charging module 7 is provided for regulating the voltage current and voltage between the electric generator 21 and the chargeable battery 22.

Further, the outside of the chargeable battery 22 is provided with a heating device 8. The heating device 8 is capable of heating the chargeable battery 22 to a chargeable temperature under an ultra-low temperature condition, so as to prevent the chargeable battery 22 from being unable to be charged due to cold conditions so that the positioning detection unit 1 cannot be powered.

Further, a protection cover 9 is further comprised, the positioning detection unit 1 is fixed outside the electric generator 21, the protection cover 9 is sleeved outside the positioning detection unit 1 and the power supply unit, and is connected and fixed with the hub cover 31 of the hub 3. The protection cover 9 can provide wind-proof, sun-proof and water-proof protections for the positioning detection unit 1 and the power supply unit, and can be prevented from being unclenched maliciously in the meanwhile.

Working principle: when the vehicle runs, the electric generator 21 generates power to generate a current, and the current flows into the commutating and voltage-stabilizing charging module 7. The current passing through the commutating and voltage-stabilizing charging module 7 respectively flows into the chargeable battery 22, the positioning module 11, the temperature sensor 13 and the acceleration sensor 14 to supply power. The positioning module, the temperature sensor 13 and the acceleration sensor 14 are all connected with the wireless communication module 12, and the wireless communication module 12 sends the corresponding information acquired by each member to a server processing platform. A user can acquire the above information from the server processing platform through a PC client or a smart mobile device, so as to monitor the vehicle.

The above is only some embodiments of the invention, and those skilled in the art may make a plurality of improvements and decorations without departing from the principle of the invention, and these improvements and decorations shall also fall within the protection scope of the invention.

I claim:

1. A self-generating positioning detector using wheel rotation, comprising a positioning detection unit (1) arranged at a vehicle hub (3) and a power supply unit, wherein the positioning detection unit (1) comprises a positioning module (11), a wireless communication module (12) and a temperature sensor (13), the power supply unit comprises an electric generator (21) having a rotor (211) and a stator (212) rotating relatively to each other, and the rotor (211) is driven to rotate by the hub (3); and input ends of the positioning module (11) and the temperature sensor (13) are electrically communicated with an output end of the electric generator (21), and output ends of the positioning module (11) and the temperature sensor (13) are electrically communicated with an input end of the wireless communication module (12).

2. The self-generating positioning detector using wheel rotation according to claim 1, further comprising a protection cover (9), wherein the positioning detection unit (1) is fixed outside of the electric generator (21), the protection cover (9) is sleeved outside of the positioning detection unit (1) and the power supply unit, and is connected and fixed with a hub cover (31) of the hub (3).

3. The self-generating positioning detector using wheel rotation according to claim 1, wherein the rotor (211) is fixed on a hub cover (31) of the hub (3), and the stator (212) is connected and fixed with a wheel axle (5).

4. The self-generating positioning detector using wheel rotation according to claim 3, wherein the stator (212) is connected and fixed with the wheel axle (5) through a flexible axle (4) or a coupler.

5. The self-generating positioning detector using wheel rotation according to claim 1, wherein the rotor (211) is fixed on a hub cover (31) of the hub (3), and the stator (212) is provided with a gravity device (6) to keep the stator (212) from rotating with the rotor (211).

6. The self-generating positioning detector using wheel rotation according to claim 5, wherein the gravity device (6) comprises a mounting base (61) connected and fixed with the stator (212), one side of the mounting base (61) vertical to a ground direction is provided with a weight balancing block (62), one side of the mounting base (61) deviating from the ground is provided with a fan blade (63), one end of the fan blade stretches out from the mounting base (61), the fan blade (63) and the weight balancing block (62) are set at an included angle, the angle faces a driving direction of the vehicle, and the angle is 45 degrees to 180 degrees.

7. The self-generating positioning detector using wheel rotation according to claim 1, wherein the power supply unit further comprises a chargeable battery (22), wherein the chargeable battery (22) is fixed on a hub cover (31) of the hub (3) and is communicated with the electric generator (21), and a commutating and voltage-stabilizing charging module (7) is arranged between the chargeable battery (22) and the electric generator (21).

8. The self-generating positioning detector using wheel rotation according to claim 7, wherein the outside of the chargeable battery (22) is provided with a heating device (8).

9. The self-generating positioning detector using wheel rotation according to claim 1, wherein the positioning detector unit (1) further comprises an acceleration sensor (14), an input end of the acceleration sensor (14) is electrically communicated with the output end of the electric generator (21), and the output end of the acceleration sensor is electrically communicated with the input end of the wireless communication module (12).

10. The self-generating positioning detector using wheel rotation according to claim 9, wherein the power supply unit further comprises a chargeable battery (22), wherein the chargeable battery (22) is fixed on a hub cover (31) of the hub (3) and is communicated with the electric generator (21), and a commutating and voltage-stabilizing charging module (7) is arranged between the chargeable battery (22) and the electric generator (21).

11. The self-generating positioning detector using wheel rotation according to claim 10, wherein the outside of the chargeable battery (22) is provided with a heating device (8).

* * * * *